United States Patent Office 3,060,213
Patented Oct. 23, 1962

3,060,213
PROCESS FOR PRODUCING ARENE
METAL CARBONYLS
John E. Wyman, Topsfield, Mass., assignor to Union
Carbide Corporation, a corporation of New York
No Drawing. Filed Apr. 1, 1960, Ser. No. 19,173
9 Claims. (Cl. 260—438)

This invention relates to organo-metallic carbonyls. More particularly, the invention relates to a process for producing arene metal carbonyls of chromium, molybdenum and tungsten.

I have discovered a process whereby a wide variety of arene metal carbonyls may be prepared from bis-(aromatic hydrocarbon) metal compounds. According to the process of this invention, a bis(aromatic hydrocarbon)metal compound wherein the metal is chromium, molybdenum or tungsten is reacted with an arene organic compound and carbon monoxide under pressure to produce an arene metal carbonyl. For example, bis-(benzene)chromium may be reacted with toluene and carbon monoxide under pressure to produce toluene chromium tricarbonyl.

The process of the present invention may be represented by the equation $$Ar'_2M + Ar + 3CO \rightarrow ArM(CO)_3 + 2Ar'$$

wherein Ar' represents an aromatic hydrocarbon group, Ar represents an arene organic compound which contains the benzenoid ring system and which is different from Ar' and M represents chromium, molybdenum or tungsten.

The benzenoid ring system is the six carbon, unsaturated ring which may be represented by the structural formula:

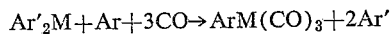

The benzenoid ring system of the compounds Ar may be substituted with one or more of a wide variety of functional groups, for example hydrogen, alkyl, aryl, aralkyl, alkaryl, alkylene, alkoxy, aryloxy, alkhydroxy, hydroxyl, amino, N-alkyl amino, N,N-dialkylamino, halogeno, aldehydo, nitro, cyano, acyl, sulfhydryl, alkylsulfonyl, arylsulfonyl, carboalkoxy, carboxamido, carboxyl, sulfonamide and the like.

The arene organic compounds of the present invention may be represented in more detail by the formula:

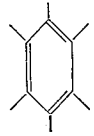

wherein the R groups may be the same or mixed and may be hydrogen and other benzenoid ring system functional group substituents such as those described in the next preceding paragraph. The R groups most preferred in the process of the present invention are hydrogen, alkyl, aryl, aralkyl, alkaryl, alkylene, alkoxy, amino, N-alkyl amino, N,N-dialkylamino and halogeno.

In a similar manner the aromatic hydrocarbon groups of the present invention may be represented in more detail by the formula:

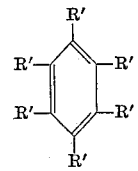

wherein the R' groups may be the same or mixed and may be hydrogen and other hydrocarbon groups such as alkyl, aryl, aralkyl, alkaryl and alkylene.

Therefore the process of the present invention may also be represented by the equation:

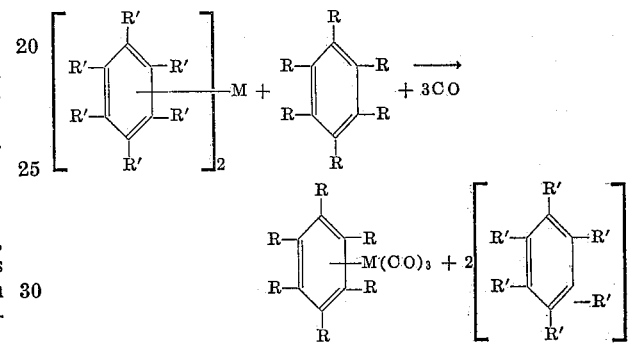

wherein R, R' and M have the meanings defined hereinabove, and the groups

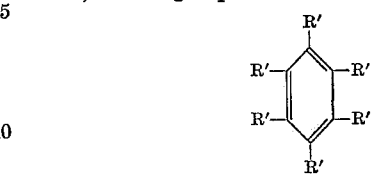

and

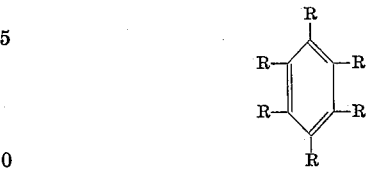

are not identical.

The bonding between the metal atoms and the organic moieties takes place through six electrons of the benzenoid ring system of the arene organic group. This type of bonding is discussed in more detail in an article by E. O. Fischer and H. P. Kogler, Angew. Chem., 68, 462 (1956). The substituents on the benzenoid ring system must be of such size and number that the benzenoid ring may approach the metal atoms sufficiently closely to permit stable bond formation to take place. For example, tertiary-butylbenzene chromium tricarbonyl and hexamethylbenzene chromium tricarbonyl are stable compounds and may be prepared by the process of this invention, but 1,3,5-tritertiary-butylbenzene chromium tricarbonyl is too unstable to permit isolation because the three bulky tertiary butyl groups do not permit the benzenoid ring system to approach the chromium atom sufficiently closely for stable bond formation to take place.

The organo-metallic compounds of the present invention may be characterized as addition compounds in contrast to organo-metallic substitution compounds. In the latter, a hydrogen or other substituent in the organic nucleus is substituted or removed in the formation of the organo-metallic compound. However, no hydrogen, alkyl or other substituent is removed from or replaced on the arene organic moiety in the formation of the arene metal carbonyls of this invention.

The process of the present invention is preferably carried out in a reaction media furnished by an excess of the reactant arene organic compound although an inert organic solvent such as heptane or petroleum ether may be used.

The temperatures at which the reaction may be carried out vary over a considerable range of from about 175° C. to 300° C. Temperatures above the decomposition temperature of the product are to be avoided. Generally, temperatures in the range of 225° C. to 300° C. are preferred.

Gaseous carbon monoxide is employed in the process at superatmospheric pressure. The pressure is preferably considerably above 15 pounds per square inch gauge (p.s.i.g.). Optimum pressure is greater than about 200 p.s.i.g. for a high yield of arene metal carbonyl.

The time employed for carrying out the reaction may vary over wide limits depending on the temperature employed. The yields are not materially reduced by maintaining the reaction mixture under reaction conditions for extended periods of time. Generally, it is preferred to maintain the reactants under the desired conditions for at least 15 minutes. The best yields of the desired product are obtained by using a manyfold stoichiometric [based on the bis(aromatic hydrocarbon)metal compound] excess of the arene organic reactant. It is also preferable to use approximately stoichiometric [based on the bis(aromatic hydrocarbon)metal compound] amounts of carbon monoxide. If a large stoichiometric excess of carbon monoxide is employed, some of the product arene metal tricarbonyl may be converted to metal hexacarbonyl by reaction with such excess of carbon monoxide.

Because of the high temperatures and pressures involved, the reaction is most conveniently carried out in a suitable pressure vessel such as an autoclave.

The bis(aromatic hydrocarbon) metal reactant may be prepared by the methods described in several published articles by E. O. Fischer and co-workers. See, for example, Z. Naturforsch, 10(b), 665 (1955); Chem. and Ind., 1956, 1953; Z. Anorg. Allgem. Chem. 286, 142 (1956); ibid, p. 146; Ber., 89, 1805 (1956); ibid, p. 1809; and Angew. Chem., 68, 462 (1956).

The arene metal tricarbonyl product may be recovered from the reaction mixture by standard procedures such as filtration and crystallization. The exact method depends upon the nature of the individual product, and specific examples of recovery procedures appear in the examples hereinbelow.

The following examples illustrate this process:

EXAMPLE 1

*Toluene Chromium Tricarbonyl*

Bis(benzene)chromium (6.7 grams) and 200 milliliters of argon-purged toluene were placed in a 300 milliliter stainless steel autoclave which was then closed. The preceding operation was conducted in the absence of air or moisture in an argon atmosphere. The autoclave was then charged with carbon monoxide to a pressure of 400 p.s.i.g. and rocked at 290° C.–300° C. for 10 hours. The autoclave was allowed to cool to room temperature. The autoclave was then vented to release a slight residual carbon monoxide pressure and the contents removed, filtered, and evaporated to dryness under partial vacuum. A yield of 4.25 grams of yellow crystalline toluene chromium tricarbonyl was recovered by recrystallization from n-heptane. This represents a yield of 60 percent of theory based on bis(benzene)chromium.

EXAMPLE 2

*Mesitylene Chromium Tricarbonyl*

In a 300 milliliter stainless steel autoclave was placed a solution of 8.0 grams of bis(toluene)chromium and 200 milliliters of argon-purged mesitylene and the vessel was closed. This operation was conducted in the absence of air and moisture in an atmosphere of argon. After charging with carbon monoxide to a pressure of 400 p.s.i.g., the autoclave was rocked at 275° C. for 4 hours. The autoclave was allowed to cool to room temperature. The contents were removed and, after treating with activated charcoal, were then filtered and evaporated to dryness under a partial vacuum. The residue was recrystallized from n-heptane and then sublimed under a partial vacuum at 160° C.–170° C. Elemental analysis showed the crystalline solid to be mesitylene chromium tricarbonyl.

Mesitylene chromium tricarbonyl is a yellow solid, M.P. 174° C.–175° C. with sublimation. It is soluble in organic solvents such as benzene, toluene, heptane, and ether.

EXAMPLE 3

*N,N-Dimethylaniline Chromium Tricarbonyl*

A solution of 8.0 grams of bis(toluene)chromium in 200 milliliters of argon-purged N,N-dimethylaniline was placed in a 300 milliliter stainless steel autoclave and the vessel was closed. The preceding operation was conducted in the absence of air and moisture under an argon atmosphere. After charging with carbon monoxide to a pressure of 400 p.s.i.g., the vessel was rocked at 275° C. for 8 hours and then allowed to cool to room temperature. The contents of the autoclave were removed, treated with activated charcoal and filtered. The filtrate was then evaporated to dryness under a partial vacuum to yield 3.8 grams of yellow, crystalline, N,N-dimethylaniline chromium tricarbonyl. This represents a yield of 45 percent of theory based on bis(toluene)chromium.

N,N-dimethylaniline chromium tricarbonyl, M.P. 143° C.–145° C., crystallizes from n-heptane solution in silky yellow needles. It is soluble in benzene, toluene, and ether, and slightly soluble in heptane. It is insoluble in water but soluble in dilute acid. It may be recovered by neutralization of the acid.

EXAMPLE 4

*Anisole Chromium Tricarbonyl*

A solution of 8.0 grams of bis(toluene)chromium in 200 milliliters of argon-purged anisole was placed in a 300 milliliter stainless steel autoclave and the vessel was closed. This operation was conducted in the absence of air and moisture under an atmosphere of argon. After charging with carbon monoxide to a pressure of 400 p.s.i.g., the vessel was rocked with heating at 275° C. for 4 hours. The autoclave was allowed to cool to room temperature. The contents were removed, filtered, and then evaporated to dryness under a partial vacuum. Recrystallization from n-heptane yielded 2.7 grams of yellow product, M.P. 84° C.–85° C. The product was anisole chromium tricarbonyl contaminated with a small amount of toluene chromium tricarbonyl.

EXAMPLE 5

*Benzene Chromium Tricarbonyl*

In a 300 milliliter stainless steel autoclave was placed a solution of 8.0 grams of bis(toluene)chromium in 200 milliliters of argon-purged benzene and the autoclave was closed. This operation was conducted in the absence of air and moisture under an argon atmosphere. The vessel was charged with carbon monoxide to a pressure of 400 p.s.i.g. and rocked at 275° C. for 8 hours. The autoclave was allowed to cool to room temperature. The contents were removed, treated with activated charcoal and filtered. The solution was evaporated to dryness to give benzene chromium tricarbonyl.

Additional examples of the process of this invention are the following: the reaction of bis(benzene) tungsten with mesitylene and carbon monoxide to give mesitylene tungsten tricarbonyl, the reaction of bis(p-xylene) molybdenum with tetrahydronaphthalene and carbon monoxide to give tetrahydronaphthalene molybdenum tricarbonyl, the reaction of bis(toluene)chromium with hexamethylbenzene and carbon monoxide in n-heptane to give hexamethylbenzene chromium tricarbonyl, the reaction of bis(hexamethylbenzene) molybdenum with o-phenylenediamine and carbon monoxide to give o-phenylenediamine molybdenum tricarbonyl, the reaction of bis(p-ethyldiphenyl)chromium with p-chlorotoluene and carbon monoxide to give p-chlorotoluene chromium tricarbonyl, the reaction of bis(diphenyl)chromium with bromobenzene and carbon monoxide to give bromobenzene chromium tricarbonyl, the reaction of bis(cumene)molybdenum with n-butylbenzene and carbon monoxide to give n-butylbenzene molybdenum tricarbonyl, the reaction of bis(toluene)tungsten with a N-n-propylaniline and carbon monoxide to give N-n-propylaniline tungsten tricarbonyl, the reaction of bis(diphenylmethane) chromium with aniline and carbon monoxide to give aniline chromium tricarbonyl, the reaction of bis(benzene) chromium with iodobenzene to give iodobenzene chromium tricarbonyl, the reaction of bis(tetrahydronaphthalene) molybdenum with N,N-diethyl aniline to give N,N-diethylaniline molybdenum tricarbonyl, the reaction of bis-(benzene) chromium with diphenylmethane and carbon monoxide to give diphenylmethane chromium tricarbonyl, the reaction of bis(benzene)chromium with p-methyldiphenyl and carbon monoxide to give p-methyldiphenyl chromium tricarbonyl, and the reaction of bis(toluene)-chromium with diphenyl and carbon monoxide to give diphenyl chromium tricarbonyl.

The compounds produced by the process of this invention may be used to deposit a metallic mirror on various substrates. All of the compounds of this invention can be decomposed by employment of temperature in excess of 400° C. to form a metallic film or coating on materials such as glass, glass cloth, resins and metals. The metallic coatings provided electrically conducting coatings for such substances as glass cloth and provide corrosion resistant coatings for metals.

For coating glass cloth, a quantity of an arene metal carbonyl produced by the process of this invention is sealed in an evacuated glass tube with a strip of glass cloth which has previously been dried in an oven at 150° C. for one hour; the tube is then heated to about 400° C. for one hour, cooled and opened. The glass cloth increases in weight by up to about 0.01 gram per gram of glass cloth and has a resistivity of approximately 2 ohms per centimeter. Thus, a conducting cloth may be prepared which is useful for the reduction of static charge.

For example, a piece of thin copper wire about 43 milliliters long, a piece of sapphire rod 3 millimeters in diameter and 22 millimeters long, and a rectangular piece of glass cloth about 50 x 20 millimeters average dimension were placed in a 30 millimeter O.D. glass tube 2 feet long. A glazed porcelain boat containing 1 gram of toluene chromium tricarbonyl was placed in the tube which was then purged with argon and heated to 300° C. The boat was then pushed into the hot zone. After 45 minutes, a chromium plate was deposited on the objects as well as on the walls of the tube, and toluene was condensing on the cool downstream end of the tube.

The glass cloth had attained a very dark metallic luster and would conduct an electric current. The copper wire had a dull, even coating of chromium metal over its entire length. The sapphire rod had an even, bright, shiny surface coating of chromium metal and this chromium plate had a resistance of 150 ohms from one end to the other.

This application is a continuation-in-part of copending application Serial No. 806,425, filed April 15, 1959, and now abandoned.

What is claimed is:

1. A process for the production of a stable arene metal carbonyl by the reaction of a bis(aromatic hydrocarbon) metal compound with an arene organic compound and carbon monoxide under pressure at a temperature between about 175° C. and about 300° C., which process may be represented by the equation $$Ar'_2M + Ar + 3CO \rightarrow ArM(CO)_3 + 2Ar'$$

wherein:
  (1) Ar is an arene organic compound containing a substituted benzenoid ring system free of condensed aromatic rings;
  (2) Ar' is an aromatic hydrocarbon group free of condensed aromatic rings;
  (3) Ar and Ar' are not identical; and
  (4) M is selected from the group consisting of chromium, molybdenum and tungsten.

2. A process for the production of a stable arene metal carbonyl by the reaction of a bis(aromatic hydrocarbon) metal compound with an arene organic compound and carbon monoxide under pressure at a temperature between about 175° C. and about 300° C., which process may be represented by the equation

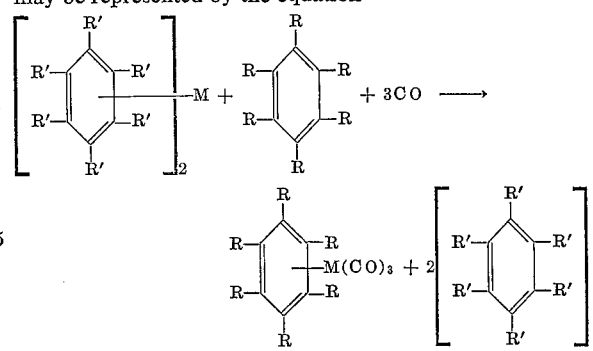

wherein:
  (1) each R' group is selected from the class consisting of hydrogen, alkyl, aryl, alkaryl, aralkyl and alkylene;
  (2) each R group is selected from the class consisting of hydrogen, alkyl, aryl, aralkyl, alkaryl, alkylene, alkoxy, amino, N-alkyl amino, N,N-dialkylamino and halogeno;
  (3) the groups

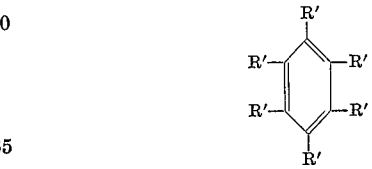

and

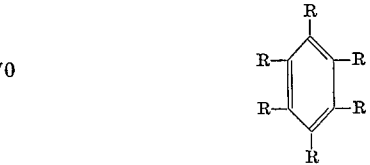

are not identical; and (4) M is selected from the group consisting of chromium, molybdenum and tungsten.

3. Process in accordance with claim 2 wherein the reaction is carried out under a carbon monoxide pressure greater than about 200 pounds per square inch gauge.

4. Process in accordance with claim 2 wherein the reaction is carried out in an inert liquid organic solvent.

5. Process in accordance with claim 2 wherein the reaction temperature is between about 225° C. and about 300° C.

6. A process for producing benzene chromium tricarbonyl which comprises reacting at about 275° C. bis(toluene)chromium, benzene and carbon monoxide at a pressure of about 400 pounds per square inch gauge.

7. A process for producing N,N-dimethylaniline chromium tricarbonyl which comprises reacting at about 275° C. bis(toluene)chromium, N,N-dimethylaniline and carbon monoxide at a pressure of about 400 pounds per square inch gauge.

8. A process for producing anisole chromium tricarbonyl which comprises reacting at about 275° C. bis(toluene)chromium, anisole and carbon monoxide at a pressure of about 400 pounds per square inch gauge.

9. A process for producing toluene chromium tricarbonyl which comprises reacting at about 290° C. bis(benzene)chromium, toluene and carbon monoxide at a pressure of about 400 pounds per square inch gauge.

No references cited.